US008444022B2

(12) United States Patent
Holcomb et al.

(10) Patent No.: US 8,444,022 B2
(45) Date of Patent: May 21, 2013

(54) POURING DEVICE WITH DEFORMABLE SPOUT

(75) Inventors: David A. Holcomb, Seattle, WA (US); David Hull, Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 387 days.

(21) Appl. No.: 12/704,346

(22) Filed: Feb. 11, 2010

(65) Prior Publication Data

US 2010/0237107 A1 Sep. 23, 2010
US 2011/0114678 A2 May 19, 2011

Related U.S. Application Data

(60) Provisional application No. 61/210,654, filed on Mar. 20, 2009.

(51) Int. Cl.
*B67D 3/00* (2006.01)

(52) U.S. Cl.
USPC ......... 222/214; 222/527; 222/210; 222/465.1

(58) Field of Classification Search
USPC ............... 222/527, 465.1, 206, 210, 214, 215
See application file for complete search history.

(56) References Cited

U.S. PATENT DOCUMENTS

| 2,812,121 | A | | 11/1957 | Sheets | 222/528 |
| 3,254,409 | A | * | 6/1966 | Gardel et al. | 30/324 |
| 3,595,446 | A | | 7/1971 | Hellstrom | 222/213 |
| 4,609,113 | A | | 9/1986 | Seki | 215/1 R |
| 4,756,439 | A | * | 7/1988 | Perock | 68/233 |
| 5,960,987 | A | * | 10/1999 | Solland et al. | 220/834 |
| 6,848,339 | B2 | * | 2/2005 | Hakim | 76/105 |
| D555,036 | S | | 11/2007 | Eck | D12/87 |
| D562,159 | S | | 2/2008 | Griffith et al. | D10/46.2 |
| 7,441,675 | B2 | * | 10/2008 | McGinley et al. | 222/129 |
| D615,424 | S | | 5/2010 | Hull et al. | D10/46.2 |
| 2004/0155070 | A1 | * | 8/2004 | McGinley et al. | 222/465.1 |
| 2006/0137490 | A1 | * | 6/2006 | Hakim | 76/105 |
| 2009/0307912 | A1 | | 12/2009 | Chapman et al. | 30/327 |

FOREIGN PATENT DOCUMENTS

| EP | 1972242 | 9/2008 |
| GB | 2269811 | 2/1994 |
| WO | 9952778 | 10/1999 |
| WO | 2004069752 | 8/2004 |

* cited by examiner

*Primary Examiner* — Kevin P Shaver
*Assistant Examiner* — Donnell Long
(74) *Attorney, Agent, or Firm* — Seed IP Law Group PLLC

(57) ABSTRACT

A pouring device includes a container, a stiffening member with first and second stiffening portions having respective terminating ends spaced from each other. The first and second stiffening portions are coupled to the container with a deformable region of the container being positioned between the terminating ends of the first and second stiffening portions. The deformable region can be more resilient than the stiffening member to form a pour spout at least in part from the deformable region upon application of a force to the container toward opposing sides of the deformable region.

9 Claims, 9 Drawing Sheets

POURING DEVICE WITH DEFORMABLE SPOUT

BACKGROUND

1. Technical Field

The present disclosure generally relates to holding and pouring tools, and more particularly, to containers configured to receive, hold, and pour contents, such as liquids.

2. Description of the Related Art

Transferring liquid from one container to another and dispensing liquid from a container are important to many applications.

For example, in cooking applications, recipes, such as food and beverage recipes, require a number of ingredients in different proportions. To communicate these proportions, recipes typically refer to a measuring standard, one of the most prominent being a unit cup or a fraction thereof. Frequently, recipes refer to required or recommended quantities of both liquid and solid ingredients based on the number or fraction of cups of the ingredients. Commonly used containers to hold and pour the ingredients include conventional measuring cups, which are generally cylindrically shaped and made from rigid material. Therefore, they are space-consuming and prone to spillage, resulting in waste and variations from preferred proportions of ingredients. Moreover, conventional measuring cups are typically made from a unitary body of material for ease of manufacturing.

In laboratory applications, beakers are used, which are typically made of glass or rigid plastics, and therefore suffer from the same drawbacks as the measuring cups discussed above. Spills in such applications can be especially detrimental because laboratory experiments commonly require exact amounts of chemicals, and some chemicals can be harmful when they come in contact with the user's skin or the environment.

BRIEF SUMMARY

According to one embodiment, a pouring device includes a container having a pliable mouth portion, and a stiffening member including first and second stiffening portions with respective terminating ends spaced from each other, the first and second stiffening portions being coupled to the container with the pliable mouth portion of the container being positioned between the terminating ends thereof. The device is further adapted to have a pour spout configured to be formed from the pliable mouth portion upon application of an inward force to the first and second stiffening portions of the stiffening member.

According to one aspect, the pouring device further includes a handle coupled to the container and configured to conform to a grip of a user. The handle can be made from a unitary body of material with the stiffening member.

According to one aspect, the pouring device further includes at least two pinch point indicators respectively positioned on the first and second stiffening portions, application of a force to the pinch point indicators forming the pour spout.

According to another embodiment, a pouring device includes a container having a base and a wall coupled to the base, forming an interior space, the wall being made from a pliable material. The device further includes a handle having an elongated grip member and a pair of opposing claw members extending from the elongated grip member, the claw members being coupled to the wall. An unreinforced portion of the wall is positioned between a pair of terminal ends of the claw members, the unreinforced portions of the wall having a first shape, whereby application of an inward force to the claw member deforms the unreinforced portion of the wall from the first shape to form a pour spout.

According to one aspect, the claw members are stiffer than the wall.

According to one aspect, the device includes pinch points located on the claw members to facilitate deformation of the unreinforced portion of the wall substantially symmetrically with respect to a deformation axis upon application of the force.

BRIEF DESCRIPTION OF THE SEVERAL VIEWS OF THE DRAWING(S)

DETAILED DESCRIPTION

Figure 1:
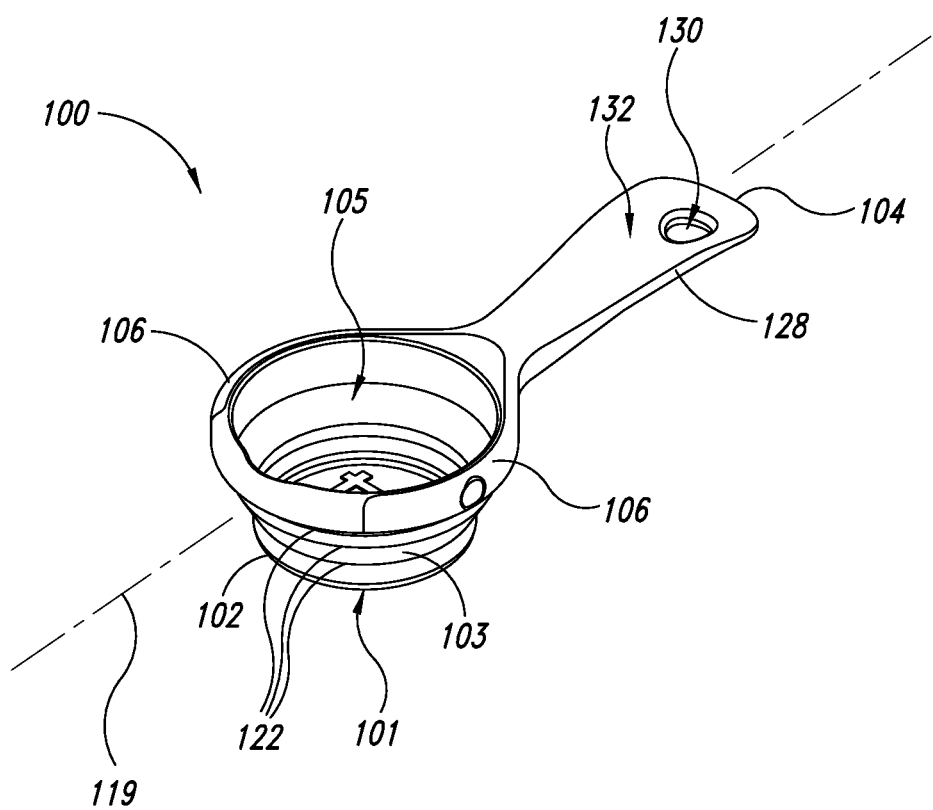
FIG. 1 is an isometric view of a pouring device according to one embodiment.

FIG. 1 illustrates a pouring device 100 according to one embodiment, including a container 102, and in one aspect, a handle 104. The container 102 includes a base 101 and a container wall 103, forming an interior space 105, configured to receive and pour liquid or solid contents. As explained in more detail below with respect to example embodiments, a pouring device according to the present disclosure provides selective control over pouring out the contents without spilling any of the contents and without requiring excess parts and material. The container 102 can include a cup, bowl, beaker, tumbler, or other product or container configured to hold and pour contents, as discussed further below with respect to some embodiments.

At least a portion of the container 102 includes a resilient or flexible material. In one embodiment, the pouring device 100 includes a stiffening member 106 coupled to the container 102 toward an open end or mouth thereof. As shown in the illustrated embodiment of FIG. 2, the stiffening member 106 can include first and second stiffening portions, such as first and second claw members or limbs 111, 113, coupled to, or extending from, the handle 104. A deformable region 109 of the container 102 can be positioned between respective terminating or free ends 112, 114 of the first and second claw members 111, 113. Therefore, a rim 115 (FIG. 3) of the pouring device 100 can be formed from at least a portion of the first and second claw members 111, 113, and deformable region 109.

The stiffening member 106 can be made from a material to be less resilient, or stiffer than, than the container 102, or at least stiffer than the deformable region 109. In one embodiment, the stiffening member 106 is made from a plastic, such as a hard plastic, and the container wall 104 is made from silicone.

Figure 3:
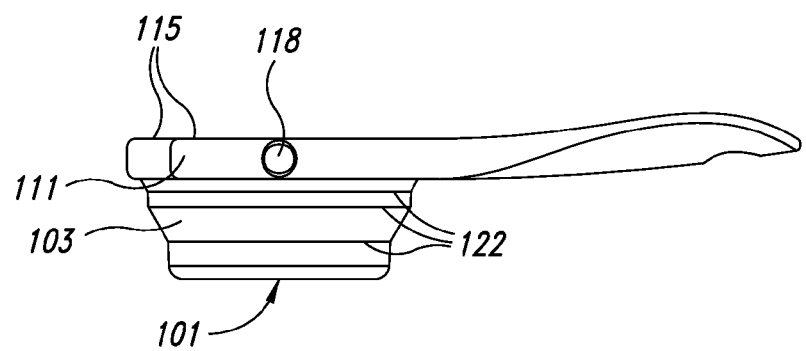
FIGS. 3 and 4 are respective side views of a pouring device according to one embodiment.
Figure 4:
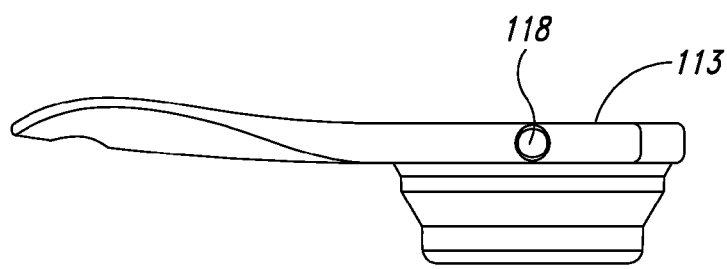
Figure 12:
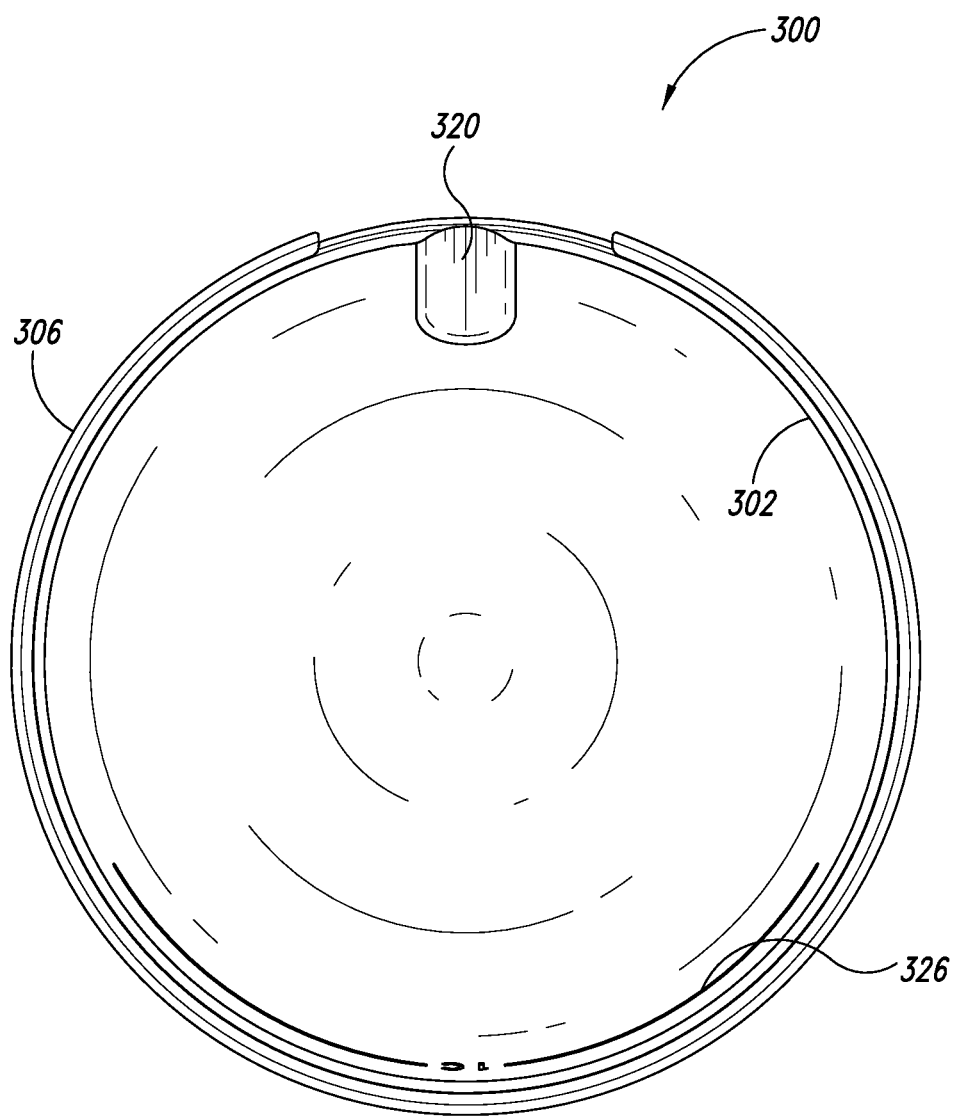
FIG. 12 is a top plan view of the pouring device of FIG. 10 according to one aspect, in an uncompressed state.
Figure 13:
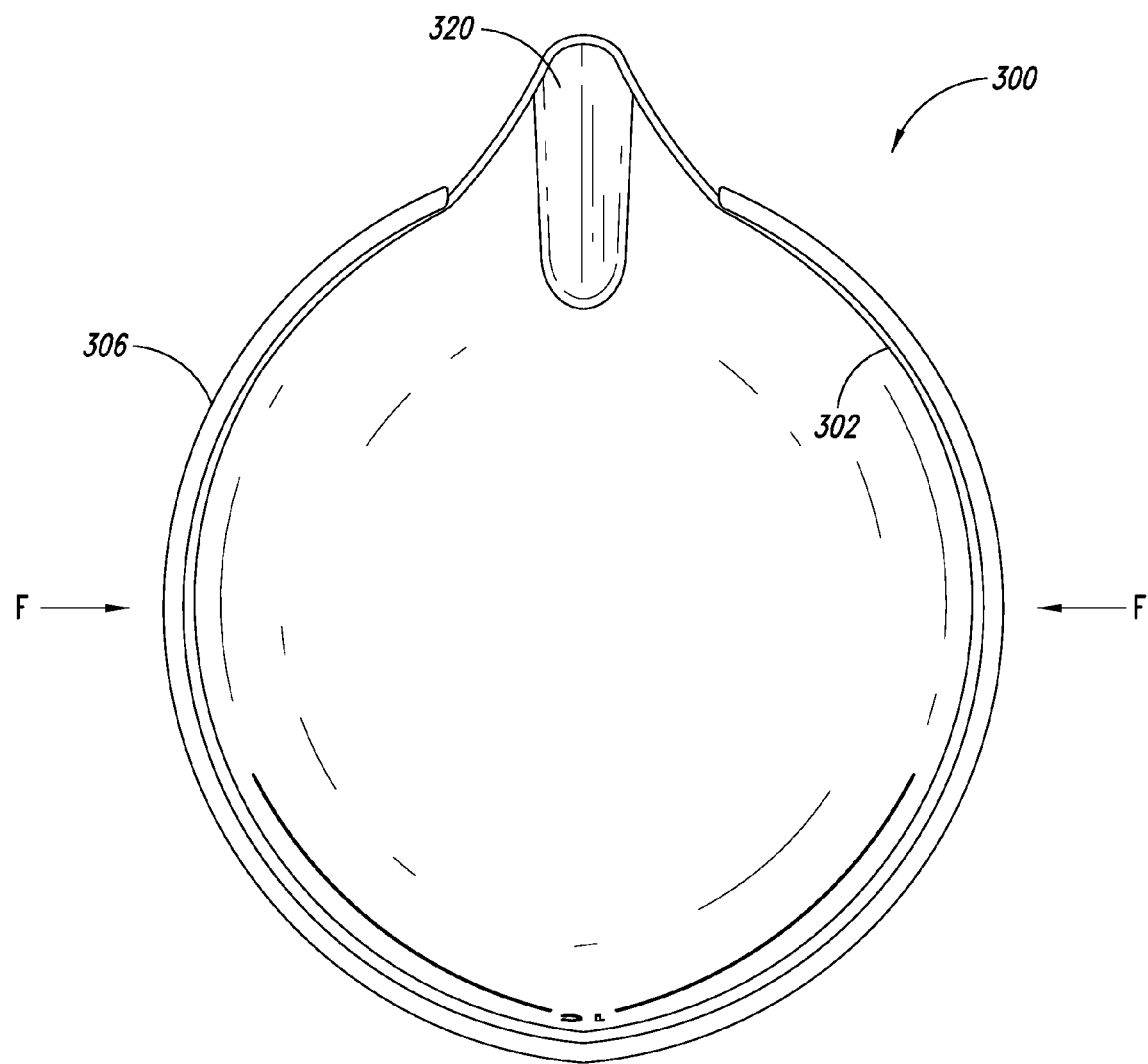
FIG. 13 is a top plan view of the pouring device of FIG. 10 in a compressed state.

Application of a force on opposing sides of the deformable region 109 deforms this region to form a pour spout and allow easy and spill-free pouring of contents from the interior space 105, one example of which can be seen by comparing FIGS. 12 and 13. Releasing the force allows the deformable region 109 return to its original shape. As illustrated in FIGS. 3 and 4, the pouring device 100 may include pinch point indicators 118 to identify locations that facilitate accurate formation of the pour spout when subject to the force. For example, pinch point indicators 118 can be positioned on the stiffening member 106, such as two pinch point indicators 118 respectively located on the first and second claw members 111, 113. The pinch point indicators 118 can be shaped to conform to a fingertip of a user, facilitating easy application of the force using two fingers. For example, they can include a depression 115 as shown in FIG. 2.

Figure 2:
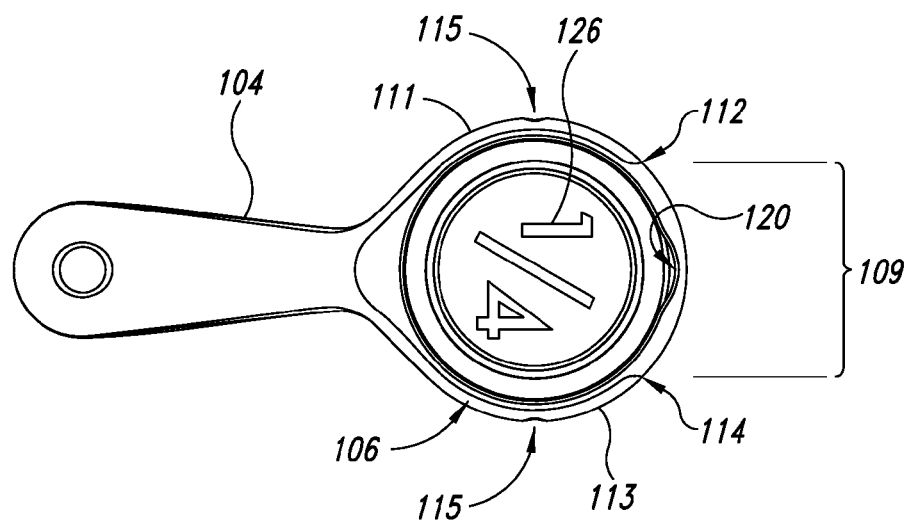
FIG. 2 is a top plan view of a pouring device according to one embodiment.

As shown in the illustrated embodiment of FIG. 2, the deformable region 109 can include a recess or concavity 120 to assist in formation, and improve the shape, of the pour spout, and better facilitate directing the contents in a relatively narrow pouring stream, when the pour spout is formed. For example, when the force is applied to the stiffening member 106 at the pinch point indicators 118, the terminating ends 112, 114 are biased toward each other, the deformable region 109 at least partially buckling, folding or deforming to form the pour spout. The pinch point indicators 118 can be located such that application of the force to the pinch point indicators 118 deforms the pour spout and/or the concavity, substantially symmetrically about a deformation axis 119 (FIG. 1).

Accordingly, a user of a pouring device according to the present disclosure can easily measure and/or efficiently pour ingredients or contents using only two fingers of one hand with only one device that is easy to manufacture and use.

In one embodiment, as illustrated in FIGS. 1 and 3, the container wall 103 includes one or more ridges or fold lines 122, depending on the size of the container, that facilitate collapsing the container wall 102, for example toward the base 101. In this embodiment, before or after use, the pouring device 100 can consume significantly less space for easy storage and/or transport.

Figure 5:
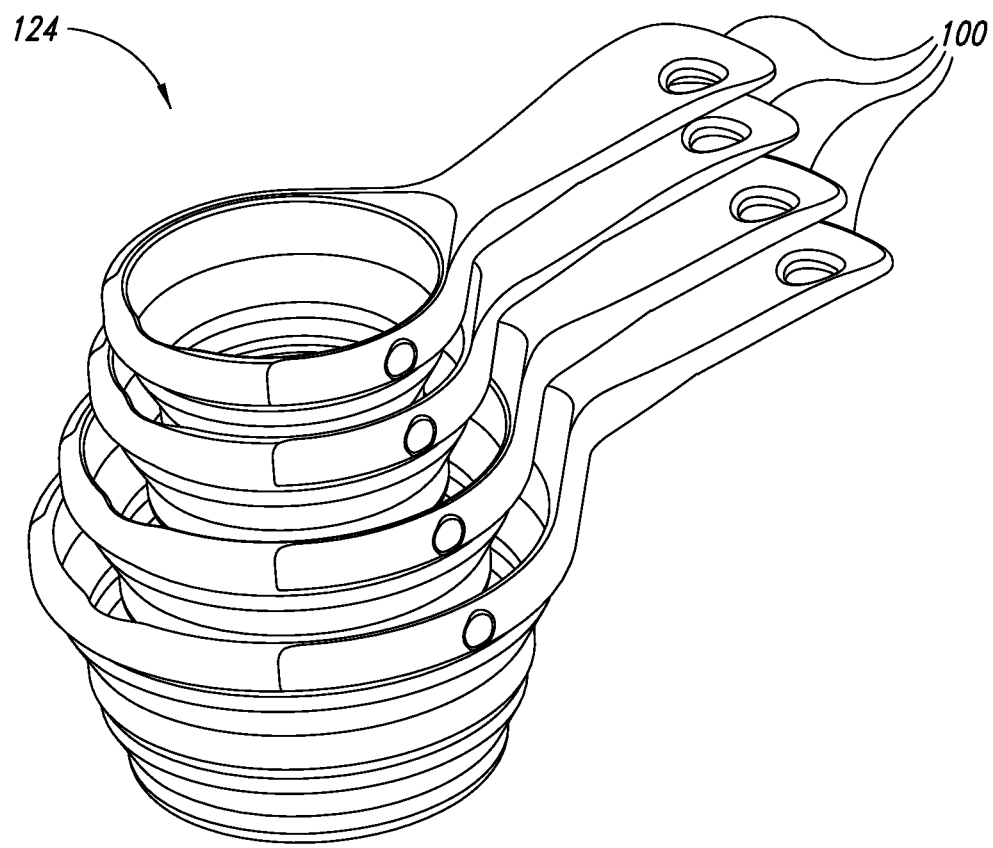
FIG. 5 is an isometric view of a measuring and pouring set according to one embodiment.

In one embodiment, as illustrated in FIG. 5, a pouring set 124 includes a plurality of pouring devices 100. Each device can have a different volume or capacity, for example corresponding to frequently used or standard fractions or multiples of a unit cup, or other measuring standard.

As illustrated in FIG. 2, the pouring device 100 can include indicia 126 corresponding to a volume.

Figure 6:
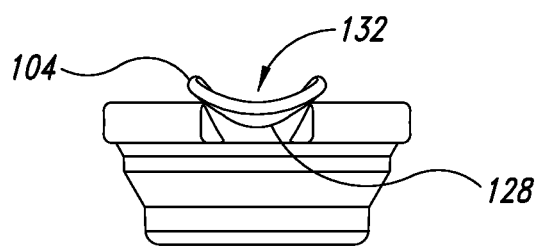
FIG. 6 is a rear view of a pouring device according to one embodiment.

As illustrated in FIG. 1, in one embodiment, the handle 104 can include an elongated member 128, which can be made from a material to be less resilient than the container wall 103, such as a plastic. The handle 104 and stiffening member 106 can be made from a unitary body of material. The handle 104 can include an opening 130 to facilitate connecting it to handles of other containers or hanging the pouring device 100. Furthermore, as shown in the illustrated embodiments of FIGS. 1 and 6, the handle 104 can include a concavity 132, for example, along an upper surface thereof, to facilitate a grip of the user, such as by conforming to a thumb of the user.

Figure 7:
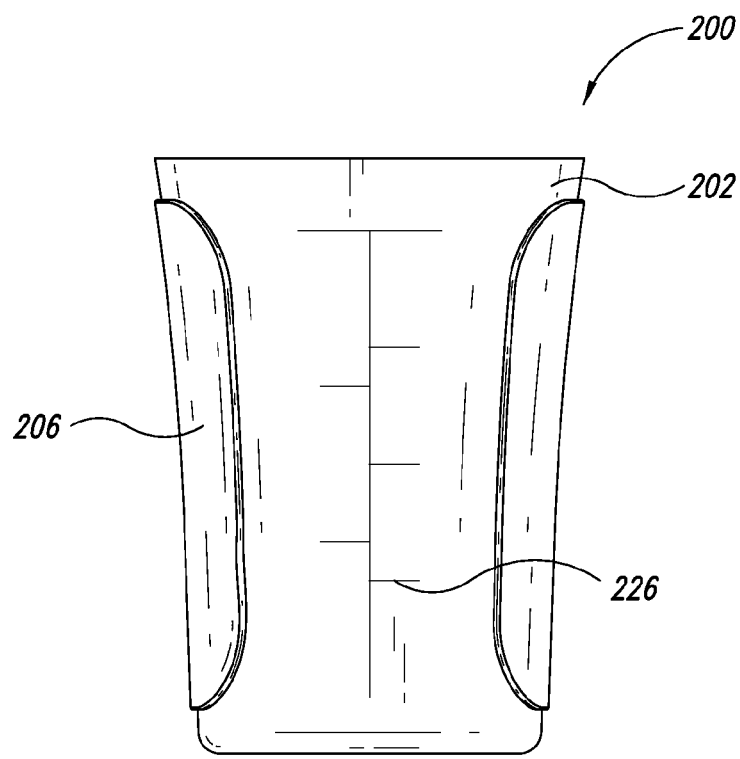
FIG. 7 is a side view of a pouring device according to another embodiment.
Figure 8:
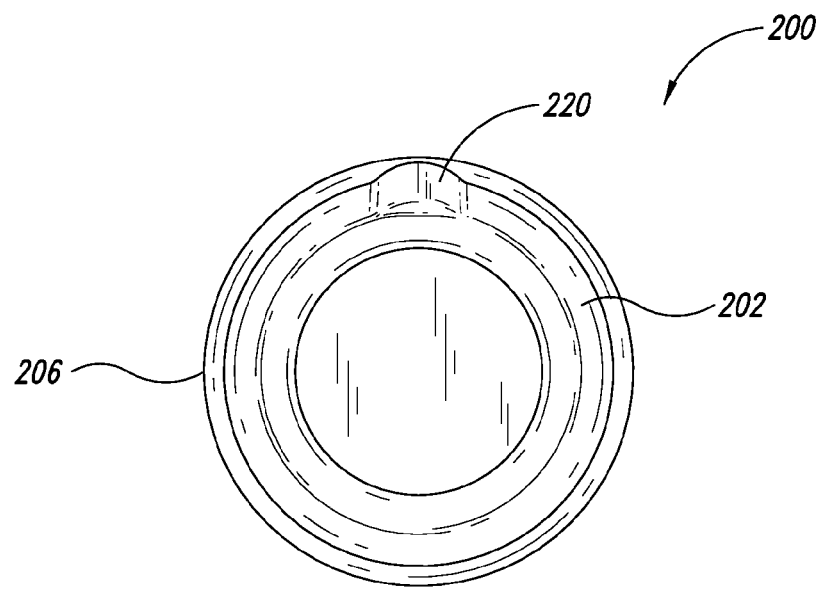
FIG. 8 is a top plan view of the pouring device of FIG. 7 according to one aspect.
Figure 9:
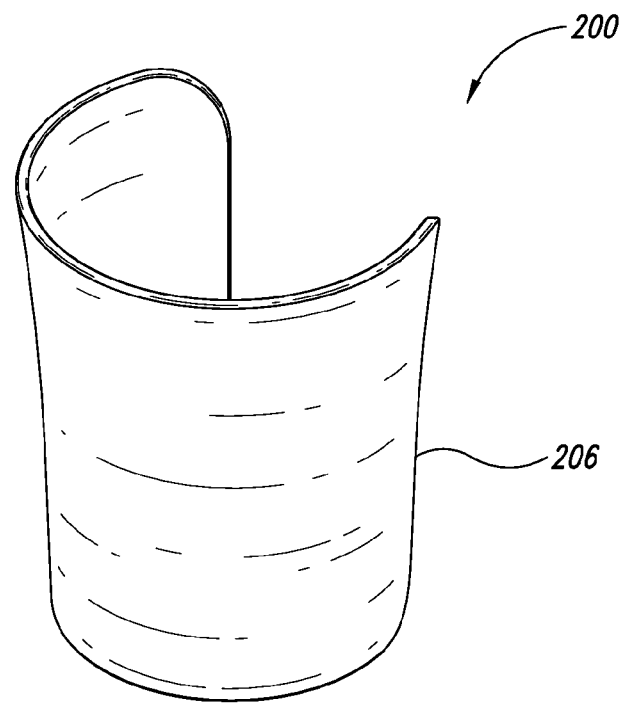
FIG. 9 is an exploded isometric view of the pouring device of FIG. 7 according to one aspect.
Figure 9:
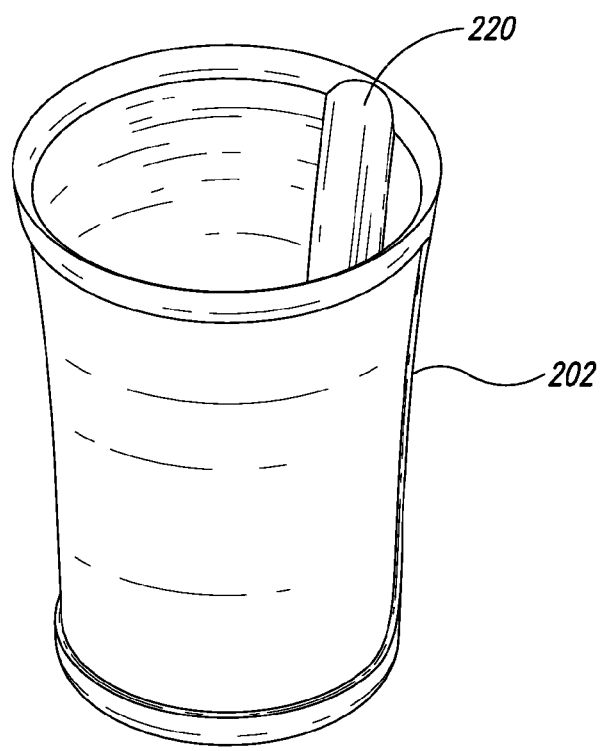
Figure 10:
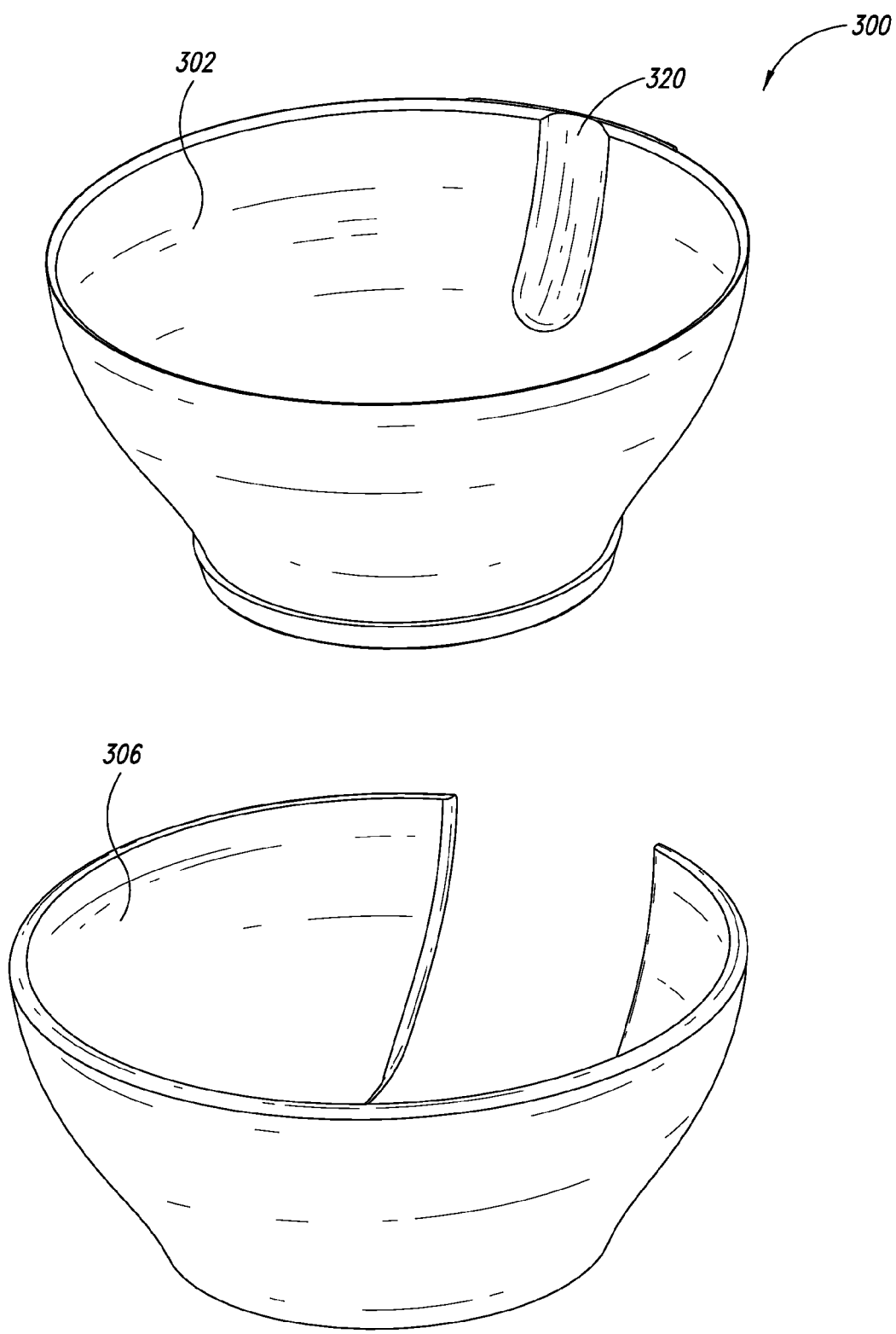
FIG. 10 is an exploded isometric view of a pouring device according to yet another embodiment.

FIGS. 7-9 illustrate a pouring device 200 according to another embodiment. The pouring device 200 includes a container 202 such as a cup, beaker, or other suitable container. The container 202 can be fabricated from a resilient or flexible material. In one embodiment, as illustrated in FIG. 7, the pouring device 200 includes a cover or shell member 206 coupled to the container 202 and extending around at least a portion of an outer surface of the container 202.

The shell member 206 can be made from a material that is stiffer than the material of the container 202. As illustrated in the exploded view of FIG. 9, the shell member 206 can include a generally cylindrical shape that is at least partially open along a length thereof, forming two free ends 212, 214. The user may exert a force on the shell 206 and bias the free ends 212, 214 toward each other.

In one embodiment, the shell member 206 can be made from a plastic, such as a hard plastic or a thermoplastic material such as nylon, and the container 202 can be made from rubber, silicone, soft plastic, or other suitable flexible material.

The shell member 206 can be permanently or removably coupled to the container 202, and when coupled thereto, a deformable region 209 of the container 202 can be positioned between respective free ends 212, 214. Therefore, when the shell member 206 is squeezed or the free ends 212, 214 are otherwise moved toward each other, the deformable region 209 deforms to form a pour spout and allow easy and spill-free pouring of contents from the container 202. Releasing the force allows the deformable region 209 return to its original shape.

As shown in the illustrated embodiment of FIG. 8, the deformable region 209 can include a recess or concavity 220 to assist in formation, and improve the shape, of the pour spout, and better facilitate directing the contents in an accurate pouring stream, when the pour spout is formed.

In addition, as illustrated in FIG. 7, the container 202 can include indicia 226 such as measuring indicia including lines and/or numbers, or other suitable indicia, which can correspond to different volumes of liquid or other content.

In embodiments in which the container 202 is a beaker, the pouring device 200 can be used to measure and transfer liquids or contents using only two fingers of one hand with only one device to expedite laboratory experiments or other protocols.

Figure 11:
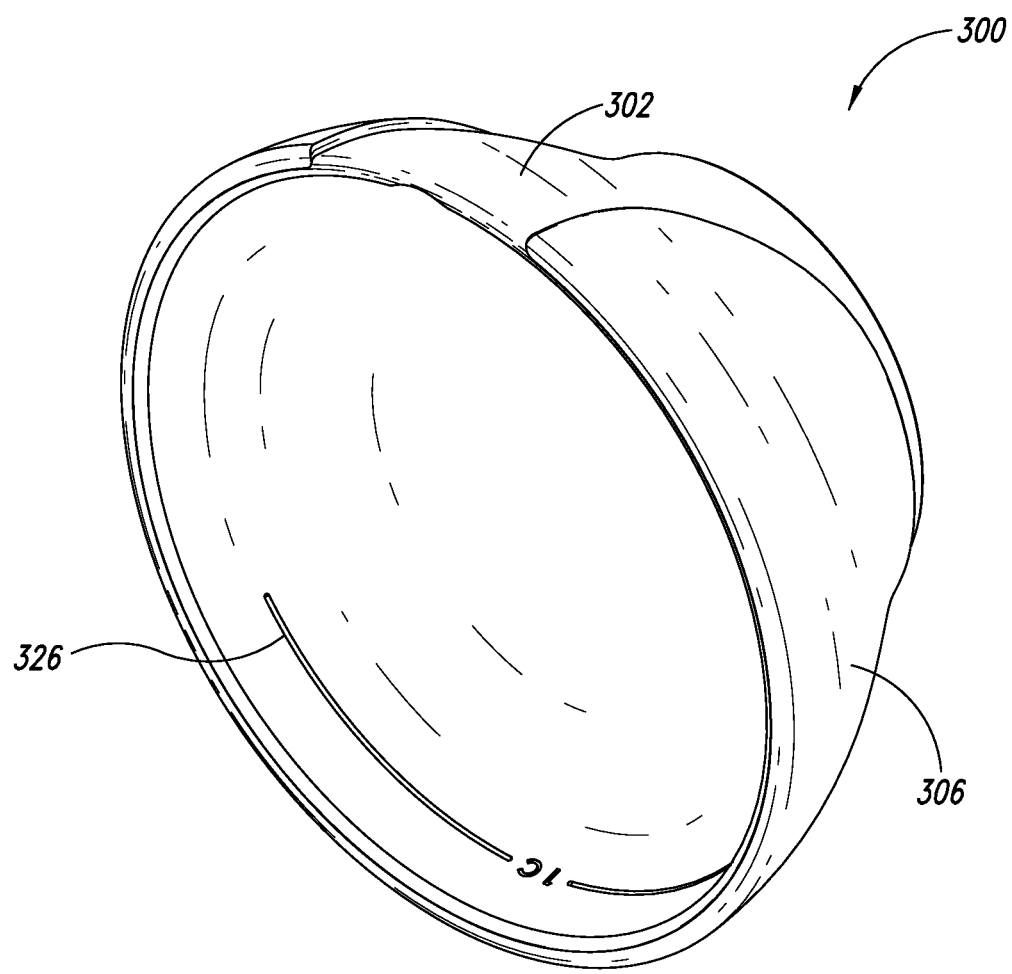
FIG. 11 is a top isometric view of the pouring device of FIG. 10 according to one aspect.

FIGS. 10-13 illustrate a pouring device 300 according to yet another embodiment. The pouring device 300 includes a container 302 such as a bowl, a deep dish, or other container. The container 302 can be fabricated from a resilient or flexible material. In one embodiment, as illustrated in FIG. 11, the pouring device 300 includes a cover or shell member 306 coupled to the container 302, an outer surface of the container 302 nesting in an inner surface of the shell member 306.

The shell member 306 can be made from a material that is stiffer than the material of the container 302. As illustrated in the exploded view of FIG. 10, the shell member 306 can include a shape that is at least partially open along a length thereof, or has a cavity therein, forming two free ends 312, 314.

In one embodiment, the shell member 306 can be made from a plastic, such as a hard plastic or a polypropylene material, and the container 302 can be made rubber, silicone, soft plastic, or other suitable flexible material such as a thermoplastic elastomer.

In one aspect shown in FIG. 11, a deformable region 309 of the container 302 can be positioned between respective free ends 312, 314. Therefore, when a force F (FIG. 13) is exerted on the shell member 306 to move the free ends 312, 314 toward each other, the deformable region 309 deforms to form a pour spout and allow easy and spill-free pouring of contents from the container 302. Releasing the force allows the deformable region 309 return to its original shape.

As shown in the illustrated embodiment of FIG. 12, the deformable region 309 can include a recess or concavity 320 to assist in formation, and improve the shape, of the pour spout, and better facilitate directing the contents in an accurate pouring stream, when the pour spout is formed.

In addition, the container 302 can include indicia 326 such as measuring indicia including lines and/or numbers corresponding to different volumes of liquid or other content.

Therefore, in embodiments in which the container 302 is a bowl or deep dish, the pouring device 300 can be used to measure and transfer liquids or contents using only two fingers of one hand with only one device that is easy to manufacture and use. This alleviates spilling of contents commonly associated with pouring from bowls due to their large rims.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A container adapted to facilitate pouring a liquid therefrom, the container comprising:
   a base and a wall collectively delineating an interior space for holding the liquid, the wall terminating at its upper end in a rim;
   a first portion of the wall extending around less than an entire perimeter of the container, opposing sides of the first portion of the wall terminating in opposing terminal ends that are spaced apart from each other by a resting distance when the container is in a resting state, the first portion of the wall being made from a first material having a first stiffness, the first material being sufficiently resilient to be deformed by a manual force between the resting state and a deformed state in which the opposing terminal ends are spaced apart from each other by a deformed distance less than the resting distance, the first material also being sufficiently resilient that the first portion of the wall returns to the resting state when the manual force is removed;
   a second portion of the wall extending around the entire container from the base to the rim, the second portion of the wall being made from a second material having a second stiffness less than the first stiffness such that, when the first portion of the wall is deformed from the resting state to the deformed state and the opposing terminal ends change from being spaced apart by the resting distance to being spaced apart by the smaller deformed distance, the portion of the second portion of the wall that is circumferentially between the opposing terminal ends of the first portion of the wall bulges outward to form a pour spout in the wall of the container.

2. The container of claim 1 wherein the base and wall are adapted to form a cup.

3. The container of claim 1 wherein an upper end of the first portion of the wall terminates at the rim.

4. The container of claim 1 wherein the second portion of the wall is located against an interior surface of the first portion of the wall.

5. A container adapted to facilitate pouring a liquid therefrom, the container comprising:
   a base and a wall collectively delineating an interior space for holding the liquid;
   a first portion of the wall extending around less than an entire perimeter of the container, opposing sides of the first portion of the wall terminating in opposing terminal ends that are spaced apart from each other by a resting distance when the container is in a resting state, the first portion of the wall being made from a first material having a first stiffness, the first material being sufficiently resilient to be deformed by a manual force between the resting state and a deformed state in which the opposing terminal ends are spaced apart from each other by a deformed distance less than the resting distance, the first material also being sufficiently resilient that the first portion of the wall returns to the resting state when the manual force is removed;
   a second portion of the wall extending between the opposing terminal ends, the second portion of the wall being made from a second material having a second stiffness less than the first stiffness such that, when the first portion of the wall is deformed from the resting state to the deformed state and the opposing terminal ends change from being spaced apart by the resting distance to being spaced apart by the smaller deformed distance, the second portion of the wall bulges outward to form a pour spout in the wall of the container;
   further comprising pressure point indicators positioned on the opposing sides of the first portion of the wall, the pressure point indicators being located such that application of the manual force against the pressure point indicators results in deformation of the first portion of the wall and formation of the pour spout.

6. The container of claim 1 wherein the second portion of the wall includes a concavity configured to facilitate formation of the pour spout.

7. The container of claim 1, further comprising a handle projecting outward from the first portion of the wall.

8. A pouring device comprising:
   a container having a base and a wall extending upward from the base and forming an interior space, the wall terminating at its upper end in a rim, at least a portion of the rim of the wall corresponding with a pour spout being made from a pliable material;
   a handle portion of the wall being made from a material stiffer than the pliable material, the handle portion comprising a pair of elongated claw members extending in opposing direction around only an upper portion of a perimeter of the wall corresponding to the rim, the claw members being coupled to the pliable material with the pliable material extending between opposing terminal ends of the claw members, the pliable material having a first shape when the pouring device is not subjected to an external deforming force, and whereby application of an inward force against the claw members deforms the pliable material between the opposing terminal ends of the claw members from the first shape to form a pour spout.

9. The fluid-pouring device of claim 8, further comprising a handle extension projecting outward from the handle portion.

* * * * *